April 22, 1941.　　　　M. KRAUT　　　　2,239,298
FLUID MOTOR
Filed July 14, 1939　　　　2 Sheets-Sheet 1

Downward force exerted by Load.

INVENTOR.
Max Kraut,
BY Russell M. Otis
ATTORNEY.

April 22, 1941.  M. KRAUT  2,239,298
FLUID MOTOR
Filed July 14, 1939  2 Sheets-Sheet 2

Downward force exerted by Load.

INVENTOR:
Max Kraut,
BY Russell M. Otis
ATTORNEY.

Patented Apr. 22, 1941

2,239,298

UNITED STATES PATENT OFFICE 2,239,298

FLUID MOTOR

Max Kraut, San Francisco, Calif.

Application July 14, 1939, Serial No. 284,513

3 Claims. (Cl. 121—164)

My invention relates to reciprocating motors adapted to be operated by fluid under pressure.

An object of my invention is to provide an efficient fluid operated reciprocating motor.

Another object is to provide a fluid motor capable of a power stroke of considerable length.

Another object is to provide a fluid motor capable of reciprocating at a very rapid rate.

Another object is to provide in a reciprocating fluid motor a fluid-tight movable wall of improved construction.

Still another object of the invention is to provide a fluid motor which is of practical construction and is of long life.

These and other apparent objects I attain in a manner which will be clear from consideration of the following description taken in connection with the accompanying drawings, of which:

Figure 1:
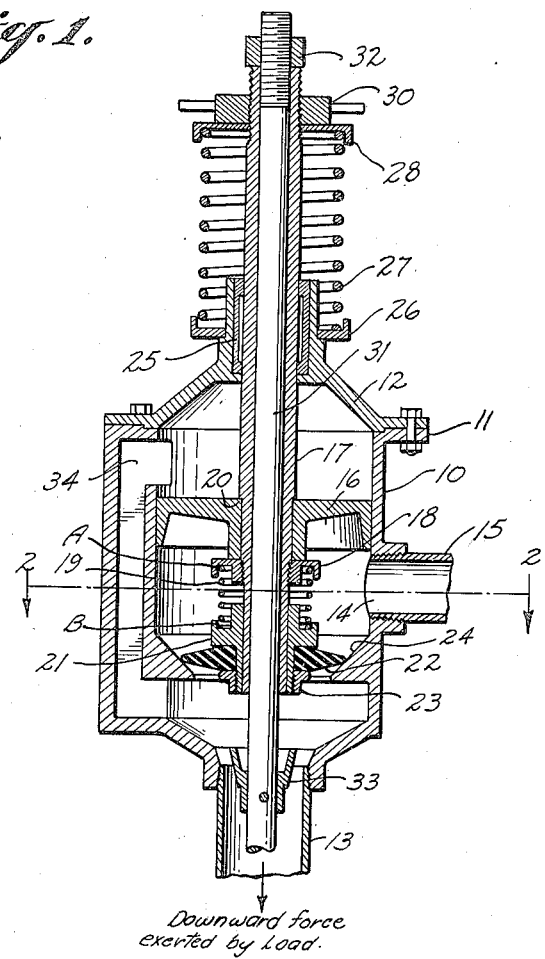
Fig. 1 is an elevational view in cross-section of one form of my fluid motor.
Figure 2:
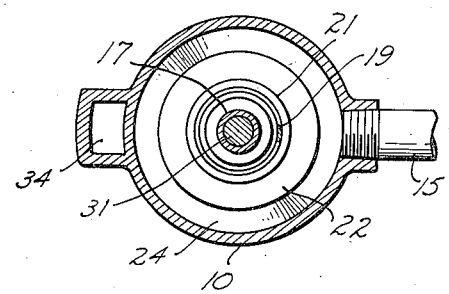
Fig. 2 is a sectional view of the motor of Fig. 1 taken on the line 2—2, as indicated.

In the embodiment of my invention illustrated in Fig. 1, a cylindrical housing 10 has, at the top, a flange 11 to which is attached a cap 12, and, at the bottom, is preferably formed with a conical portion to which is connected a fluid outlet pipe 13. The housing 10 has a fluid inlet 14 opening through the side wall thereof into the chamber within and to which is connected a fluid inlet pipe 15. The upper wall of the chamber is movable and, in the embodiment of Fig. 1, comprises a piston 16 which is mounted to slide in the housing 10 above the inlet 14 and is secured to a centrally located tube 17 by means of a retaining nut 18 which is in threaded engagement with the tube 17 and which holds the piston tightly against a shoulder 20 on the tube 17.

Slidably mounted on the tube 17 below the piston 16 is a valve structure comprising a sleeve 21 carrying a valve element 22 clamped between the outwardly extending upper portion of the sleeve 21 and a retaining nut 23 in threaded engagement with the sleeve 21. The valve element 22 may be of any suitable material, metallic or otherwise. The valve element 22, however, is preferably made of rather stiff rubber or composition material, of sufficient flexibility to seat tightly without great accuracy being required in its motion. Preferably the valve element seats against a conical seat 24 forming part of the housing 10 and located below the inlet 14. A tension spring 19 surround the tube 17, is attached to the nut 18, as by welding at A, and is also attached to the sleeve 21, as by welding at B.

The tube 17 extends upwardly from the piston 16 and is guided in a bushing 25 held in the upper part of the cap 12. Resting on the cap 12 is a spring abutment 26 against which presses a spring 27 abutting at its upper end a spring abutment 28 which is adjustably retained by an adjusting nut 30 in threaded engagement with the upper end of the tube 17. Slidably disposed within the tube 17 is a rod 31 which is threaded at its top end and carries a nut 32 which rests on the top of the tube 17. The rod 31 projects downwardly from the lower end of the sleeve 21 and the nut 23 and extends out through the outlet pipe 13. In the operation of the device the rod 31 is reciprocated up and down and whatever it is desired to reciprocate is attached to the lower end of the rod 31, although it may, of course, be attached to the top of the rod 31, if desired. The motor is adapted to be operated in conjunction with a load connected to the rod 31 in such a manner that a downward force is exerted by the load on the rod 31. At a distance below the nut 23, comparable to the desired length of stroke, is located the top of a valve engaging member 33 which is attached to the rod 31 for movement therewith. At a certain stage in the upward stroke of the rod 31, the member 33 is adapted to engage the lower face of the nut 23 and lift the valve element 22 off its seat 24. The distance between the top of the member 33 and the bottom of the nut 23 is less than the permissible upward travel of the piston 16. An overflow passage 34 is formed at one side of the housing 10 and connects with the space above the piston 16 and with the fluid outlet to provide a way of escape for fluid which may leak past the piston 16, and also to equalize the pressure in the space above the piston and the space below the valve.

In describing the operation of the motor it will be assumed that a downwardly directed load exists on the rod 31, which may be due to a spring, a weight to be reciprocated, or other means depending upon the use to which the motor is put. At the start of operation, then, the parts of the motor will be as represented in Fig. 1, with the valve element 22 seating on the seat 24, and the spring 27 supporting the rod 31 against the downwardly directed force on it. Fluid under pressure is permitted to flow through the inlet 14 by opening a control valve in the inlet pipe 15, and pressure is exerted upwardly against the piston 16 and downwardly against the valve element 22. Consequently, the piston 16 moves upwardly, carrying with it the tube 17 and the rod 31. During the upward movement of the piston 16, the valve element remains seated on its seat 24, closing the outlet, because of the downwardly directed fluid pressure on it. As the piston moves upward the spring 19 exerts an upward force on the valve element 22 tending to unseat it, and if the tension of the spring 19 were made sufficiently great at the end of the desired stroke it could be made to overcome the force of fluid against the valve element 22 and cause the valve element to be unseated at a certain point in its stroke. Preferably, however, the tension of the spring 19 is not sufficient to overcome the force of fluid against the valve element 22 and the valve element remains seated until the member 33 engages the nut 23 and lifts the valve element 22 off its seat 24. When the valve element 22 lifts, fluid is permitted to flow past the valve through the outlet and there is a momentary collapse of fluid pressure in the chamber. The instant that fluid has access to the under side of the valve element 22, the resultant force of fluid on the valve element 22 largely disappears and the spring 19 jerks the valve element 22 upward. From the instant of cracking the valve, the action is cumulative, with the result that the valve opens wide very quickly and there is a very rapid decrease of pressure within the fluid chamber. Upon collapse of the fluid pressure within the chamber, the downwardly directed force on the rod 31 pulls the rod 31, the tube 17, the piston 16 and the valve element 22 downwardly until the valve element seats on the seat 24, closing the fluid outlet. Pressure immediately starts to build up in the chamber and raises the piston 16 upwardly to start another cycle of reciprocatory motion.

The length of stroke may be adjusted by varying the position of the nut 32 on the rod 31 and the rapidity of reciprocation may be controlled by adjusting the pressure of fluid supplied to the motor through control of a valve in the inlet pipe 15. The compression of spring 27 may be adjusted for different loads on the rod 31 by varying the position of the nut 30 on the tube 17.

Figure 3:
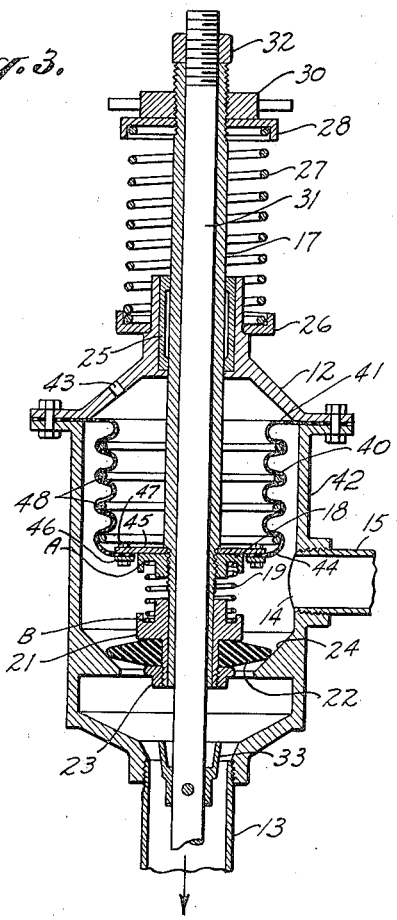
Fig. 3 is an elevational view in cross-section of an alternative form of my fluid motor.

An alternative form of my motor is illustrated in Fig. 3. In this form the movable upper wall of the fluid chamber is connected in a fluid tight manner with the housing 42 by means of a bellows 40 which construction is substituted for the piston 16. The bellows 40 is preferably made of a flexible material such as rubber and has an outwardly directed flange 41 at the top which is clamped between the flange of cylindrical housing 42 and the cap 12. The housing 42 may be similar to the housing 10 of the motor of Fig. 1 except that the passage 34 is omitted. The cap 12 is the same as in Fig. 1 except that a hole 43 therethrough is provided to maintain atmospheric pressure above the bellows 40. The bellows 40 preferably terminates at the lower end in an inwardly directed flange 44 which is clamped between a metal plate 45 and a ring 46 by bolts 47. The plate 45 is secured to the tube 17 by being clamped between a shoulder on the tube 17 and the nut 18 in threaded engagement with the tube. The bellows 40 are preferably molded with a corrugated axially extending wall and laterally rigid rings 48, preferably of metal, are placed inside the bellows, one ring in each of the outwardly directed folds of the corrugated wall. The action of the rings is to prevent the inward lateral collapse of the bellows when fluid pressure is exerted in the space below and around the outside of the bellows. The only substantial motion of the bellows, therefore, is one in the axial direction. The remainder of the motor of Fig. 3 may be the same is in that of Fig. 1. In operation, the motor of Fig. 3 is similar to that of the motor of Fig. 1, the wall 45 being acted upon by the fluid under pressure to raise the tube 13 and the rod 31 just as the piston 16 in the motor of Fig. 1 is acted upon to accomplish the same result. The construction of Fig. 3 has the advantage over the piston 16 that no leakage of fluid from the fluid chamber can occur.

Figure 4:
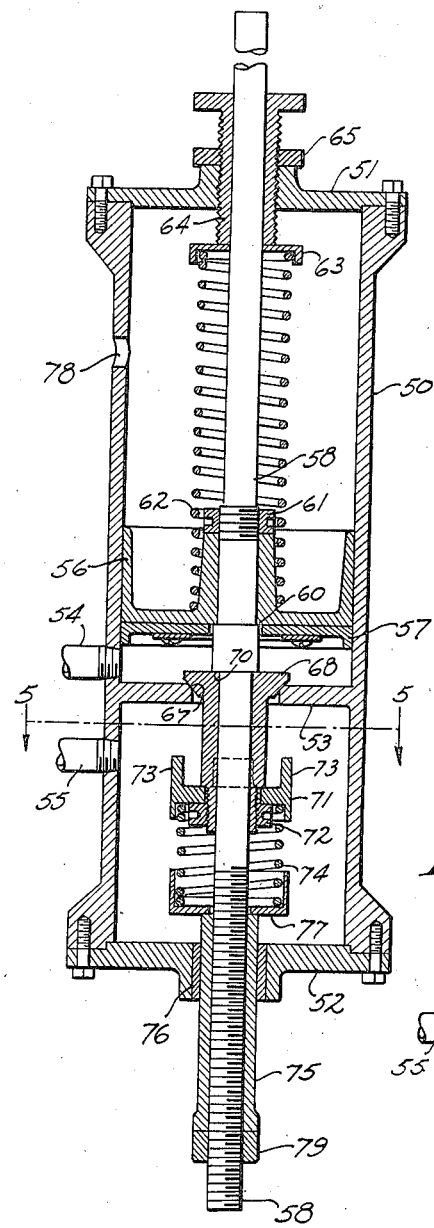
Fig. 4 is an elevational view in cross-section of an alternative form of fluid motor.
Figure 5:
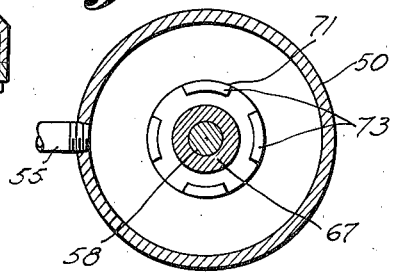
Fig. 5 is a sectional view of the motor of Fig. 4 taken on the line 5—5, as indicated.

Another alternative construction is illustrated in Figs. 4 and 5. In this form, a cylindrical housing 50 is employed, having a cover plate 51 secured to one end thereof and a cover plate 52 secured to the other end thereof. As oriented in Fig. 4, the space within the housing 50 is divided into upper and lower parts by a partition 53 having a central hole therein. Above the partition 53, a fluid inlet pipe 54 connects with the space within the housing and is connected to a supply of fluid under pressure. Below the partition 53 a fluid outlet pipe 55 is connected with the space within the housing. A piston 56 fitting the inside of the housing 50 above the inlet 54 is adapted to slide up and down within the housing. A cup leather 57 is preferably secured to the face of the piston 56. The piston 56 is clamped on an axially extending rod 58 against a shoulder 60 thereof by a nut 61 in threaded engagement with the rod 58. In this embodiment, the motor carries within itself a loading spring 62 for effecting return of the piston and is not dependent upon any outside load. The spring 62 surrounds the rod 58 and bears downwardly on the piston 56 and upwardly against an abutment 63 which is piloted on the rod 58 and is adjustably retained in position by the screw 64 which passes through the cover plate 51 in threaded engagement therewith. A lock nut 65 in threaded engagement with the screw 64 locks the screw 64 in fixed position. The rod 58 passes slidably through a hole in the screw 64 and may be connected to any member or device which it is desired to reciprocate.

The upper edge of the hole in the partition 53 is beveled to form a valve seat 67. Adapted to seat on the seat 67 and extending through the hole in the partition 53 is a valve element 68 slidably mounted on the rod 58. The valve element 68 abuts a shoulder 70 on the rod 58 in the lowest position of the piston 56. Abutting a shoulder on the lower portion of the valve element 68 is a member 71 which is retained by a nut 72 in threaded engagement with the threaded lower end of the valve element 68. The member 71 has upwardly extending projections 73 at intervals circumferentially therearound and has a downwardly extending rim for retention of a compression spring 74 abutting the member 71. The rod 58 extends downwardly through the valve element 68 and through the cover plate 52 and carries threaded on its threaded lower end an adjusting nut in the form of a sleeve 75 which is adapted to slide in a bushing 76 mounted in the cover plate 52. A lock nut 79 is also threaded on the rod 58. The upper end of the sleeve nut 75 engages a member 77 which is slidable on the rod 58 and which has a turned up rim within which is disposed the lower end of the spring 74 abutting the member 77. It is evident that any member or device to be reciprocated may, if desired, be attached to the lower end of the rod 58 instead of the upper projecting portion thereof. A hole 78 may be located in the housing above the uppermost position of the piston 56 for connecting the space above the piston with the atmosphere and for permitting escape of fluid which may leak past the piston 56.

In operation, the parts of the motor are normally in the positions shown prior to admission of fluid. When fluid under pressure is admitted through the inlet 54, it acts on the under side of the piston 56 to force it upward and on the valve element 68 to hold it tightly against its seat 67. As the piston 56 moves upward, carrying the rod 58 with it, the spring 62 is compressed, and the member 77 is moved upwardly toward the member 71. During the upward movement of the piston the valve is held closed by fluid pressure, in spite of the upward force on the valve element 68 exerted by the spring 74, until the member 77 engages the member 71 and lifts the valve element 68 off its seat. As soon as fluid gets to the under side of the valve element 68 and equalizes the fluid pressure on both sides thereof, there is nothing to hold the valve element down, and as a result the valve element 68, the member 71, and the nut 72 are immediately forced upward by action of the compressed spring 74 in such manner that the valve opening is suddenly increased and there is an instantaneous drop of pressure below the piston 56. It will be seen that in the embodiment of Fig. 4, the valve element, after being lifted off its seat, is pushed to a wide open position, while in the embodiment of Fig. 1, it is pulled to wide open position. The valve element 68 continues upwardly until the projections 73 on the member 71 stop against the under side of the partition 53. In this position, fluid passes from the inlet 54 through the valve opening in the partition 53, through the openings between the projections 73, and out through the outlet 55. When the drop in pressure below the piston occurs, the spring 62 forces the piston 56 downwardly, the shoulder 70 engages the valve element 68, and forces the valve element 68 downwardly until the parts all come to rest in the positions shown in Fig. 4. Fluid pressure immediately builds up, forces the piston 56 upwardly and the cycle is repeated indefinitely. It is apparent that as the piston 56 moves up and down in the cylinder 50 the rod 58 also moves, carrying with it the member or device to be reciprocated. The length of stroke may be varied by adjusting the position of the nut 75.

If desired, a bellows similar to that shown in Fig. 3 may be employed in place of the piston 56 in the motor of Fig. 4.

All of the forms of my motor disclosed herein may be operated by use of either gas or liquid as the operating fluid. My motors are found to be capable of very rapid reciprocation. An important feature of my motors is that they are capable of causing reciprocation through a stroke of considerable length, and that during this stroke a great force can be exerted by the reciprocating parts.

It will be understood that the design and construction of my motors and the parts thereof may be varied widely without departing from the spirit and scope of the invention as defined in the appended claims.

I claim as my invention:

1. A reciprocating fluid motor comprising: walls forming a chamber provided with an inlet and an outlet for fluid, one of the walls of said chamber being movable; a reciprocable member moved by said movable wall; a valve structure including a valve element adapted to normally close said outlet; means associated with said reciprocable member and adapted, at a certain stage in the travel of said movable wall away from said valve element, to positively engage said valve structure to move said valve element and open said outlet; and a tension spring within said chamber having one end connected to move with said reciprocable member and the other end connected to said valve structure, whereby said valve element is pulled toward said movable wall at the moment of opening said outlet.

2. A reciprocating fluid motor comprising: walls forming a chamber provided with an inlet and an outlet for fluid, one of the walls of said chamber being movable; a tube connected to said movable wall for movement therewith; a valve structure slidable on the exterior of said tube and including a valve element adapted to normally close said outlet; a rod adjustably carried in said tube; a member attached to said rod on the opposite side of said valve element from said movable wall and spaced from said valve structure; and a spring disposed between said movable wall and said valve element and having one end connected for movement with said tube and the other end connected for movement with said valve elemnet.

3. A reciprocating fluid motor comprising: walls forming a chamber provided with an inlet and an outlet for fluid, one of the walls of said chamber being movable; a reciprocable member secured to said wall and extending through said outlet; a valve structure slideable on said reciprocable member and including a valve element adapted to normally close said outlet; a member secured to said reciprocable member on the opposite side of said valve from said movable wall and adapted, at a certain stage in the travel of said movable wall away from said valve element, to positively engage said valve structure to move said valve element and open said outlet; and a spring connected between said valve structure and said reciprocable member to be deflected by movement of said movable wall away from said valve element and adapted to urge said valve element toward said movable wall at the moment of opening said outlet.

MAX KRAUT.